United States Patent [19]
Chamberlin

[11] 3,725,378
[45] Apr. 3, 1973

[54] POLYMERIZATION OF ETHYLENE
[75] Inventor: John M. Chamberlin, St. Louis, Mo.
[73] Assignee: Monsanto Company, St. Louis, Mo.
[22] Filed: Jan. 29, 1971
[21] Appl. No.: 111,131

Related U.S. Application Data

[63] Continuation of Ser. No. 721,212, April 15, 1968, abandoned, which is a continuation of Ser. No. 780,953, Dec. 17, 1958, abandoned.

[52] U.S. Cl..........................260/94.9 R, 260/88.2 B
[51] Int. Cl..............................C08f 1/60, C08f 3/04
[58] Field of Search................................260/94.9 R

[56] References Cited

UNITED STATES PATENTS

| | | | |
|---|---|---|---|
| 2,932,632 | 4/1960 | Barry et al. | 260/94.9 |
| 2,870,130 | 1/1959 | Davison et al. | 260/94.9 |

FOREIGN PATENTS OR APPLICATIONS

| | | |
|---|---|---|
| 471,310 | 2/1951 | Canada |
| 915,240 | 1/1963 | Great Britain |
| 934,444 | 8/1963 | Great Britain |

*Primary Examiner*—Joseph L. Schofer
*Assistant Examiner*—Edward J. Smith
*Attorney*—Elizabeth F. Sporar and M. N. Cheairs

[57] ABSTRACT

A continuous process for producing ethylene polymers by conducting the polymerization of an ethylene feed material at elevated pressures and temperatures in a tubular reactor in the presence of a free-radical initiator for the polymerization and injecting the ethylene feed material containing initiator at a point or points along the length of the tubular reactor while it is simultaneously introduced at the reactor inlet.

10 Claims, No Drawings

POLYMERIZATION OF ETHYLENE

CROSS REFERENCE TO RELATED APPLICATION

This application is a streamlined continuation of application Ser. No. 721,212 filed Apr. 15, 1968 which in turn is a continuation of application Ser. No. 780,953 filed Dec. 17, 1958, both of said applications now abandoned.

BACKGROUND OF THE INVENTION

The present invention relates to an improved process for the catalytic polymerization of ethylene.

It is known that ethylene can be polymerized by subjecting it to the action of high pressures, i.e., pressures in excess of 500 atmospheres, under temperatures up to about 400°C either in the presence or absence of an initiator such as oxygen and/or compounds which generate free-radicals. The polymerization reaction is a highly exothermic one. Since the temperature increases as the reaction proceeds to a maximum or peak and considerable heat is evolved, successful operation of a continuous polymerization process requires that provision must be made for heat control. The methods of heat control employed must be adequate to avoid an undue rise in temperature which results in violent runaway reactions and explosions. One method for achieving such control involves the use of a long tubular reactor wherein some measure of temperature control is obtained from the relatively large ratio of heat dissipating surface to reactor volume. Another effective measure for controlling the temperature further in such a reactor involves the use of diluents for the ethylene, for example, the use of industrial gases containing ethylene such as cracking still gases. Other suitable techniques which have been proposed include the use of a metal or alloy of high thermal conductivity as the material for construction of the reactor or for lining it, efficient agitation in the system, and the introduction of a cooling medium such as water or benzene or the catalyst solution or suspension into the reactor at intermediate stages throughout the reaction zone. While certain advantages can be gained by employing such techniques, some of them limit significantly the maximum attainable conversion. In fact, in some of the prior art processes, conversion is deliberately kept at a relatively low level in order to achieve optimum control of the reaction under given conditions of temperature, pressure, and catalyst concentration. Alternatively, where high levels of conversion are achieved, other problems are introduced such as alteration of polymer properties and/or separation of the polymer from the extraneous materials charged to the reactor for controlling the reaction.

It has now been discovered that effective control of the polymerization reaction can be maintained together with a substantial increase in conversion if, instead of the conventional technique of introducing ethylene at one point in the reactor, it is injected at multiple points along the reaction tube. The multiple ethylene injection technique utilizes part of the sensible cooling available in the cold incoming monomer to effect the heat distribution required to achieve higher conversions. The injected ethylene is made to serve both as a coolant and as a monomer for further polymerization. The advantages of introducing for cooling purposes a feed material which can be continuously recycled in contrast to an extraneous solvent or diluent which must subsequently be separated from the product are obvious. Further, the multiple injection technique permits the use of higher total concentrations of initiator. Generally, the ethylene converted to polymer in this rapid reaction at a given temperature and pressure increases with initiator concentration. With this new technique, initiator may be injected with the ethylene to maintain initiator concentration at an optimum level so that the injected ethylene may itself be converted to polymer as it picks up the heat in controlling the reaction. With this new mode of operation, the temperature profile may be maintained more uniform and a more uniform reaction rate is assured resulting in many instances in a polymer product of improved quality as well as better conversions.

SUMMARY OF THE INVENTION

It is an object of the present invention, therefore, to provide a new and improved process for polymerizing ethylene. Another object of the invention is to provide a continuous process for polymerizing ethylene which provides for higher conversions and permits more accurate control of the reaction. It is a further object of the invention to provide a continuous process for the polymerization of ethylene whereby a polyethylene product which gives a film having better optical properties than that produced from polyethylene made by conventional techniques is obtained. These and other objects of the invention which will become apparent hereinafter are realized by conducting the polymerization of ethylene under suitable conditions of temperature and pressure in a tubular reactor and injecting ethylene at a point or points along the length of the reactor while it is simultaneously introduced at the reactor inlet. The injected ethylene contains the required amount of initiator and also of modifier if the latter is desired.

DESCRIPTION OF THE PREFERRED EMBODIMENTS

The following example is presented to illustrate the invention but is not to be construed as limiting it in any manner whatsoever.

EXAMPLE

The polymerization of ethylene was conducted in a pressure-resistant jacketed tubular reactor having an L/D ratio in excess of 1000. The tube employed was in convolute form having ten sections of approximately equal length. A mixture of ethylene and the propane used as a modifier was divided into two or more parts. The same amount of initiator was added to each. One part of the feed ethylene was introduced at the entrance of the reactor and the other part or parts were injected at predetermined points in the reactor downstream of the inlet. The ethylene was injected under turbulent conditions. In the ten-section reactor used with a single injection point, this point was at the entrance to the fifth section, i.e., at a point about 40 percent of the distance between the entrance or inlet to the reactor and the exit or discharge point at which polymer and unreacted ethylene were discharged from the reactor; with two injection points downstream, the injection points were at the entrance to the third and fifth sections, respectively, i.e., at points about 20 percent and about 40%, respectively, of the distance between the entrance or inlet of the reactor and the exit or discharge point at which polymer and unreacted ethylene were discharged from the reactor. The ethylene was partially polymerized and the reaction mixture was let down to a pressure of about 1500 psi for separation of the polymer from the unreacted gas. The polymer was then recovered for extrusion, cooling, and dicing into unrefined polymer pellets.

Following the above-described procedure, a number of polymerization runs were made using both per-oxygen type compounds and oxygen as initiators. Data for these runs are presented in Table I together with comparative data for control runs wherein all the ethylene feed containing initiator and modifier was introduced in the conventional manner, i.e., at the inlet or entrance to the reactor. These data demonstrate that significantly higher conversions are achieved using the technique of multiple injection of the ethylene feed.

While the examples specify certain conditions for the polymerization reaction, substantial changes can be made from these without departing from the scope of the invention. For example, the reactor tube need not be the sensible cooling available in the ethylene while at the same time effecting maximum heat distribution to maintain the polymerization reaction and polymerize some of the incoming ethylene. With too large a ratio of injected to inlet ethylene, for example, and only one injection point, the temperature after mixing may be well below the initiation temperature of certain initiators and in such cases additional heat would be needed to bring the mixture back up to initiation temperature. The temperature of the injected ethylene depends upon the ratio of the latter to the inlet ethylene and should be kept as low as possible to secure maximum cooling. Ethylene cooled to below ambient temperature may be used to provide a large heat reservoir. However, the lowest temperature to which the injected ethylene feed can be cooled with any given number of injection points is governed also by the resultant temperature of the reaction mixture after injection which in turn depends to some extent upon the particular initiator employed in the system. Di-tert-butyl peroxide, for example, generates free radicals at about 140°C and, therefore, permits temperatures of the reaction mixture after injection of the cooler ethylene to be as low as 140°C. Higher mixing temperatures are required, for example, with oxygen as the initiator and lower ones can be used with lauroyl peroxide as the initiator. Mixtures of initia-

TABLE I

| Run No. | Pressure, p.s.i. | Flow rate, lb./hr. | Flow split[1] | Injected feed, temp. °C. | Reactor temp., °C. | Initiator system Type | Initiator system P.p.m. | Propane, percent | Conv. percent |
|---|---|---|---|---|---|---|---|---|---|
| 385A | 25,000 | 151 | None | | 230 | A[2] | 225 | 5.0 | 15.4 |
| 373 | 25,000 | 148 | 1:1 | 40 | 230 | A[2] | 340 | 5.1 | 21.6 |
| 376 | 25,000 | 150 | 1:2 | 64 | 230 | A[2] | 350 | 4.5 | 22.1 |
| 377 | 25,000 | 151 | 1:3 | 66 | 230 | A[2] | 500 | 4.5 | 24.0 |
| 414 | 22,000 | 147 | None | | 240 | Oxygen | 34 | 1.4 | 13.5 |
| 413A | 22,000 | 149 | 1:0.5 | 9 | 240 | ...do... | 53 | 2.5 | 18.1 |
| 404 | 30,000 | 169 | None | | 225 | ...do... | 20 | 3.9 | 13.6 |
| 408B | 30,000 | 153 | 1:1 | 47 | 225 | ...do... | 38 | 4.1 | 21.1 |
| 409B | 30,000 | 149 | 1:0.5 | 47 | 225 | ...do... | 40 | 3.8 | 22.2 |
| 419B | 30,000 | 162 | 1.0:0.2:0.8 | 48 | 225 | ...do... | 35 | 2.8 | 24.0 |
| 420A | 30,000 | 152 | 1.0:0.4:0.6 | 40 | 225 | ...do... | 42 | 2.5 | 25.0 |

[1] Inlet ethylene:injected ethylene (parts by weight).
[2] A=4:1 lauroyl peroxide:ditertiary butyl peroxide.

convolute in form but may be in other form, such as straight. Also, while a single elongated tube is exemplified, a plurality of similarly constructed reaction tubes can be operated in parallel to obtain greater production.

Any number of injection points and any ratios of flow split may be used to provide increasing conversions. The optimum number of injection points will depend upon various other factors such as reactor length, the pressure employed, flow rates, etc. The injection point or points should be located so as to permit adequate completion of polymerization within a reactor section or zone for the particular conditions employed before each injection. Preferred operation for maximum conversion under a given set of polymerization conditions calls for injecting the ethylene at the points in the reactor where the reaction temperature peaks. Choice of an exact peak temperature or temperature range is governed by the maximum allowable temperature to which the ethylene can be heated without carbonization and by the particular properties desired in the polymer. In the preparation of normally solid polyethylenes, peak temperatures employed generally lie in the range from about 200°C to about 300°C.

The ratio of injected ethylene to inlet ethylene must be so regulated as to provide maximum utilization of tors such as lauroyl peroxide and di-tert-butyl peroxide have some advantage also because of the difference in their decomposition temperatures which results in the generation of free radicals at the different temperature levels and insures continuity of the reaction by providing a relatively constant concentration of free radicals. The mixing temperature can be calculated as a function of injected feed temperature, flow split, and peak reaction temperature before injection. Generally, injected ethylene is maintained at a temperature from about 10°C to about 50°C although temperatures down to 0°C and even lower, for example, as low as −100°C, can be employed in some instances.

Thus, the specific formula for optimum operating conditions is different in every case. The flow rate, flow split between injected and inlet ethylene, injected ethylene feed temperature and injection points must be related to the particular initiator used and the peak temperature attained under a given set of polymerization conditions. These are readily subject to calculation, however, by those skilled in the art.

The conditions of temperature and pressure are those commonly employed in the polymerization of ethylene and they may vary over a wide range. Depending upon the catalyst used, the temperature may vary from 40°C to about 400°C. It is generally preferred to operate at temperatures in the range from about 200°C to about 300°C. Pressures in the range from 5000 psi to 60,000 psi can be used with those ranging from 15,000 to 35,000 being preferred.

In addition to the oxygen and peroxides exemplified, any organic or inorganic compound which generates free radicals or a mixture of such compounds is suitable for use as the initiator. Among examples of such materials are, for example, per-oxygen type compounds such as hydrogen peroxide, dialkyl dioxides like diethyl peroxide and ditertiary butyl peroxide, butyryl peroxide, lauroyl peroxide, benzoyl peroxide, alkyl-hydroperoxides, diperoxy dicarbonate esters, tert alkyl percarboxylates such as tert butyl perbenzoate, potassium persulfate, and the like; azo-type compounds such as azo-bis(isobutyronitrile); azines such as benzylazine; oximes such as acetone oxime; etc. Particularly suitable are mixtures of the per-oxygen type compounds such as, for example, lauroyl peroxide and di-tert-butyl peroxide in various proportions. The initiator is usually employed in the form of a solution or suspension in a solvent such as benzene, for example. Only small amounts of initiator are required. Generally, initiator concentration will vary from about 0.0005 percent to about 2 percent of the total weight of material charged to the polymerization reactor. The initiator is introduced into the reactor with the ethylene in both the inlet and injected streams. One advantage of the present invention is that it permits introduction of greater amounts of initiator into the reactor without any of the undesirable effects such as carbonization which ordinarily accompany the use of the same amounts of initiator when the multiple injection of ethylene is not employed.

Polymerization modifiers may be used or not as desired. It is well known that the properties of ethylene polymers may be "tailored" to a significant extent by conducting the polymerization of the ethylene in the presence of certain compounds ordinarily referred to as modifiers but sometimes also called chain-transfer agents. Among the many such compounds may be mentioned saturated hydrocarbons or a mixture of such hydrocarbons examples of which are paraffins, both normal and iso-, such as ethane, propane, n-butane, isopentane; cycloparaffins such as cyclohexane and alkyl cycloparaffins such as methyl-cyclohexane; alcohols such as tert-butyl alcohol; aromatic hydrocarbons such as toluene, xylene, etc., and various other compounds such as acetone, hydrogen, carbon dioxide, and phenolic compounds. The amount of modifier used is generally within the range from about 0.5 percent to about 10 percent by weight of the ethylene, or, calculated on a molar basis, a corresponding general range based on the ethylene flow to the reactor of from about 0.1 mole percent to about 60 mole percent, the exact concentration range depending upon the molecular weight of the particular modifier or chain-transfer agent employed. With propane as shown in the example above, for instance, the amount of this modifier employed on a molar basis would vary from about 0.3 to about 6.6 mole percent; with an alcohol such as tert-butyl alcohol, amounts from about 0.2 to about 4.0 mole percent would be used; with xylene, the range would be from about 0.1 to about 2.9 mole percent; with acetone from about 0.2 to about 5.1 mole percent; with hydrogen from about 6.5 to about 60.7 mole percent, and so forth. The advantages of process of the present invention can be gained in polymerization systems using such modifiers as well as in those wherein no modifiers are employed.

The polymer product obtained using the multiple ethylene injection technique is superior to that made by conventional techniques. This is evident from a comparison of the properties of polyethylene made in a tubular reactor wherein all the ethylene feed is introduced conventionally at the inlet to the reactor with a polyethylene made in the same reactor and under the same polymerization conditions except that the ethylene is introduced at two points downstream in the reactor as well as at the inlet. For a given range of melt index and density, the latter polymer when refined and blown into film produces a material with significantly better gloss and clarity and less haze than the film which is produced from the former.

The process of the invention is also applicable for copolymerizing ethylene with other olefins and vinyl monomers.

What is claimed is:

1. In a process for polymerizing ethylene to produce normally solid polymers of ethylene in a tubular reactor at high pressure and elevated temperatures in the presence of a free-radical-generating initiator for the polymerization introduced at the inlet of said tubular reactor with gaseous ethylene to be polymerized and wherein the reaction temperature rises to a peak within the range from about 200° to about 300°C, the improvement comprising rejecting gaseous ethylene and initiator at at least one point into said tubular reactor downstream from the inlet of said tubular reactor where a reaction temperature peak occurs, said gaseous ethylene and initiator being injected at substantially the same point, and said injected gaseous ethylene being employed as the coolant at a temperature and in an amount sufficient to maintain the temperature of the polymerization mixture at the point of injection below said peak temperature but above the temperature required for the initiation of ethylene polymerization by said initiator so as to obtain an increase in conversion of ethylene to polymers of ethylene.

2. In a process for polymerizing ethylene to produce normally solid polymers of ethylene in a tubular reactor at high pressure and elevated temperatures in the presence of a free-radical-generating initiator for the polymerization introduced at the inlet end of said tubular reactor with an ethylene feed material comprising at least 89 percent by weight of gaseous ethylene to be polymerized and wherein the reaction temperature rises to a peak within the range from about 200° to about 300°C, the improvement comprising injecting additional feed material comprising at least 89% by weight of gaseous ethylene and initiator at at least one point into said tubular reactor downstream from the inlet end of said tubular reactor where a reaction temperature peak occurs, said additional feed material and initiator being injected at substantially the same point and the gaseous ethylene in said injected feed material being employed as the coolant at a temperature and in an amount sufficient to maintain the temperature of the polymerization mixture at the point of injection below said peak temperature but above the temperature required for the initiation of ethylene polymerization by said initiator so as to obtain an increase in conversion of ethylene to polymers of ethylene, ethylene constituting at least 89 percent by weight of the total feed to said tubular reactor.

3. In a process for polymerizing ethylene to produce normally solid polymers of ethylene in a tubular reactor at a pressure in the range of 5,000 psi to 60,000 psi at a temperature in the range of 40° C to 300°C in the presence of oxygen as initiator for the polymerization introduced at the inlet end of said tubular reactor with an ethylene feed material comprising at least 89 percent by weight of gaseous ethylene to be polymerized and wherein the reaction temperature rises to a peak within the range from about 200° to about 300°C, the improvement comprising injecting additional feed material comprising at least 89 percent by weight of gaseous ethylene and oxygen at at least one point into said tubular reactor down-stream from the inlet end of said tubular reactor where a reaction temperature peak occurs, said additional feed material and oxygen being injected at sub-stantially the same point and the gaseous ethylene in said injected feed material being employed as the coolant at a temperature and in an amount sufficient to maintain the temperature of the polymerization mixture at the point of injection below said peak temperature but above the temperature required for the initiation of ethylene polymerization by said oxygen so as to obtain an increase in conversion of ethylene to polymers of ethylene.

4. In a process for polymerizing ethylene to produce normally solid polymers of ethylene in a tubular reactor at a pressure in the range of 5,000 psi to 60,000 psi at a temperature in the range of 40° C to 300° C in the presence of a peroxide as initiator for the polymerization introduced at the inlet end of said tubular reactor with an ethylene feed material comprising at least 89 percent by weight of gaseous ethylene to be polymerized and wherein the reaction temperature rises to a peak within the range from about 200° to about 300° C, the improvement comprising injecting additional feed material comprising at least 89 percent by weight of gaseous ethylene and peroxide at at least one point into said tubular reactor downstream from the inlet end of said tubular reactor where a reaction temperature peak occurs, said addition feed material and peroxide being injected at substantially the same point and the gaseous ethylene in said injected feed material being employed as the coolant at a temperature and in an amount sufficient to maintain the temperature of the polymerization mixture at the point of injection below said peak temperature but above the temperature required for the initiation of ethylene polymerization by said peroxide so as to obtain an increase in conversion of ethylene to polymers of ethylene.

5. In a process for polymerizing ethylene to produce normally solid polymers of ethylene in a tubular reactor having a length-to-diameter ratio greater than 1000: at a pressure of 30,000 psi and a temperature of 225° C in the presence of 42 parts of oxygen per million parts of gaseous ethylene feed to said tubular reactor as an initiator for the polymerization introduced at the inlet end of said tubular reactor with gaseous ethylene containing 2.5 percent by weight of propane, the improvement comprising injecting additional gaseous ethylene containing 2.5 percent propane in admixture with 42 parts of oxygen per million parts of gaseous ethylene feed at a temperature of 40° C into said tubular reactor at two additional points spaced downstream from the inlet end of said tubular reactor 20 and 40 percent, respectively, of the total length of said tubular reactor, the ratio of the ethylene introduced at the inlet end to the ethylene injected at said two additional downstream points in said tubular reactor being 1:0. 4:0. 6 by weight and the total feed rate to said tubular reactor being 152 lb/hr.

6. In a process for polymerizing ethylene to produce normally solid polymers of ethylene in a tubular reactor at high pressure and elevated temperatures in the presence of a free-radical-generating initiator for the polymerization and up to 10% by weight of the ethylene of a chain-transfer agent introduced at the inlet of said tubular reactor with gaseous ethylene to be polymerized and wherein the reaction temperature rises to a peak within the range from about 200° to about 300°C, the improvement comprising injecting gaseous ethylene and initiator and chain-transfer agent at at least one point into said tubular reactor downstream from the inlet of said tubular reactor where a reaction temperature peak occurs, said gaseous ethylene, initiator and chain-transfer agent being injected at substantially the same point, and said injected gaseous ethylene being employed as the coolant at a temperature and in an amount sufficient to maintain the temperature of the polymerization mixture at the point of injection below said peak temperature but above the temperature required for the initiation of ethylene polymerization by said initiator so as to obtain an increase in conversion of ethylene to polymers of ethylene.

7. The process of claim 6 wherein the chain-transfer agent is selected from the group consisting of saturated aliphatic hydrocarbons, aromatic hydrocarbons, alcohols, acetone, hydrogen, carbon dioxide and phenolic compounds.

8. In a process for polymerizing ethylene to produce normally solid polymers of ethylene in a tubular reactor at high pressure and elevated temperatures in the presence of from about 0.0005 percent to about 2 percent of the total weight of material charged to said tubular reactor of a free-radical-generating initiator and from about 0.5 percent to about 10% by weight based on ethylene of a chain-transfer agent introduced at the inlet end of said tubular reactor with gaseous ethylene to be poly-merized and wherein the reaction temperature rises to a peak within the range from about 200° to about 300° C, the improvement comprising injecting additional gaseous ethylene and from about 0.0005 percent to about 2 percent of the total weight of material charged to said tubular reactor of said initiator and from about 0.5 to about 10 percent by weight based on ethylene of a chain-transfer agent at at least one point into said tubular reactor downstream from the inlet end of said tubular reactor where a reaction temperature peak occurs, said gaseous ethylene, initiator and chain-transfer agent being injected at substantially the same point, and the gaseous ethylene in said injected gaseous ethylene, initiator and chain-transfer agent being employed as the coolant at a temperature and in an amount sufficient to maintain the temperature of the polymerization mixture at the point of injection below said peak temperature but above the temperature required for the initiation of ethylene polymerization by said initiator so as to obtain an increase in conversion of ethylene to polymers of ethylene.

9. In a process for polymerizing ethylene to produce normally solid polymers of ethylene in a tubular reactor at a pressure in the range of 5,000 psi to 60,000 psi at a temperature in the range of 40°C to 300°C in the presence of from about 0.0005 percent to about 2 percent of the total weight of material charged to said tubular reactor of oxygen as initiator for the polymerization and from about 0.5 percent to about 10 percent by weight based on ethylene of a chain-transfer agent introduced at the inlet end of said tubular reactor with gaseous ethylene to be polymerized and wherein the reaction temperature rises to a peak within the range from about 200° to about 300° C, the improvement comprising injecting additional gaseous ethylene and from about 0.0005 percent to about 2 percent of the total weight of material charged to said tubular reactor of oxygen and from about 0.5 percent to about 10 percent by weight based on ethylene of a chain-transfer agent at at least one point into said tubular reactor downstream from the inlet end of said tubular reactor where a reaction temperature peak occurs, said additional gaseous ethylene and oxygen and chain-transfer agent being injected at substantially the same point, and the gaseous ethylene in said injected gaseous ethylene, oxygen and chain-transfer agent being employed as the coolant at a temperature and in an amount sufficient to maintain the temperature of the polymerization mixture at the point of injection below said peak temperature but above the temperature required for the initiation of ethylene polymerization by said oxygen so as to obtain an increase in conversion of ethylene to polymers of ethylene.

10. In a process for polymerizing ethylene to produce normally solid polymers of ethylene in a tubular reactor at a pressure in the range of 5,000 psi to 60,000 psi at a temperature in the range of 40°C to 300°C in the presence of from about 0.0005 percent to about 2 percent of the total weight of material charged to said tubular reactor of a peroxide as initiator for the polymerization and from about 0.5 percent to about 10 percent by weight based on ethylene of a chain-transfer agent introduced at the inlet end of said tubular reactor with gaseous ethylene to be polymerized and wherein the reaction temperature rises to a peak within the range from about 200° to about 300°C, the improvement comprising injecting additional gaseous ethylene and from about 0.0005 percent to about 2 percent of the total weight of material charged to said tubular reactor of a peroxide and from about 0.5 percent to about 10 percent by weight based on ethylene of a chain-transfer agent at at least one point into said tubular reactor downstream from the inlet end of said tubular reactor where a reaction temperature peak occurs, said additional gaseous ethylene and peroxide and chain-transfer agent being injected at substantially the same point, and the gaseous ethylene in said additional gaseous ethylene, peroxide and chain-transfer agent being employed as the coolant at a temperature and in an amount sufficient to maintain the temperature of the polymerization mixture at the point of injection below said peak reaction temperature but above the temperature required for the initiation of ethylene polymerization by said peroxide so as to obtain an increase in conversion of ethylene to polymers of ethylene.

* * * * *

PO-1050
(5/69)

UNITED STATES PATENT OFFICE
CERTIFICATE OF CORRECTION

Patent No. __3,725,378__ Dated __April 3, 1973__

Inventor(s) __John M. Chamberlin__

It is certified that error appears in the above-identified patent and that said Letters Patent are hereby corrected as shown below:

Column 6, Claim 1, line 30, for "rejecting" read -- injecting --.

Column 7, Claim 4, line 43, for "addition" read -- additional --.

Column 7, Claim 5, line 56, for "1000:" read -- 1000:1 --.

Signed and sealed this 20th day of November 1973.

(SEAL)
Attest:

EDWARD M. FLETCHER, JR.
Attesting Officer

RENE D. TEGTMEYER
Acting Commissioner of Patents